No. 815,827. PATENTED MAR. 20, 1906.
C. A. HOFFMAN.
COMBINED EYEGLASS AND SPECTACLE MOUNTING.
APPLICATION FILED NOV. 14, 1904.

INVENTOR
CHARLES A. HOFFMAN
BY
Paul Paul
HIS ATTORNEYS

UNITED STATES PATENT OFFICE.

CHARLES A. HOFFMAN, OF MINNEAPOLIS, MINNESOTA.

COMBINED EYEGLASS AND SPECTACLE MOUNTING.

No. 815,827.          Specification of Letters Patent.          Patented March 20, 1906.

Application filed November 14, 1904. Serial No. 232,575.

*To all whom it may concern:*

Be it known that I, CHARLES A. HOFFMAN, of Minneapolis, Hennepin county, Minnesota, have invented certain new and useful Improvements in Combined Eyeglass and Spectacle Mountings, of which the following is a specification.

In fitting eyeglasses or spectacles to noses of different size and shape and in carrying out the various prescriptions as regards the position of the bridge or spring with respect to the lens either in front or the rear or in the plane of the same it has been found necessary to carry a large stock of bridges and nose-guards of various shapes and sizes, and even then it is frequently necessary to practically reconstruct a stock mounting to render it suitable for a particular case.

The object, therefore, of my invention is to provide a mounting comprising a bridge or spring and nose-guards that can be easily and quickly adapted for a deep or shallow nose and for any desired position with respect to the lens.

The invention consists generally in a bridge or spring that is adjustably mounted with respect to the lens.

Further, the invention consists in providing a nose-guard that is adjustable with respect to the bridge and to the lens.

Further, the invention consists in improved means for securing the bridge and guard to the lens-post.

Further, the invention consists in various constructions and combinations, all as hereinafter described, and particularly pointed out in the claims.

Figure 1:
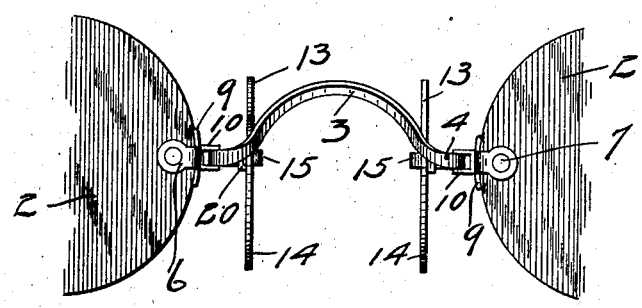
Figure 2:
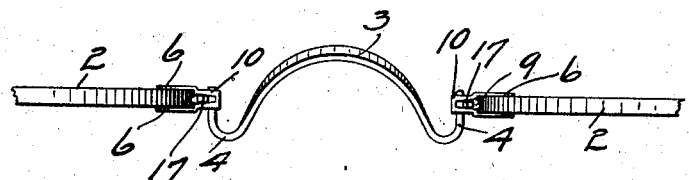
Figure 3:
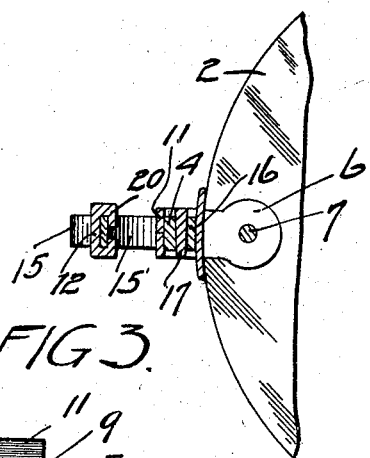
Figure 4:
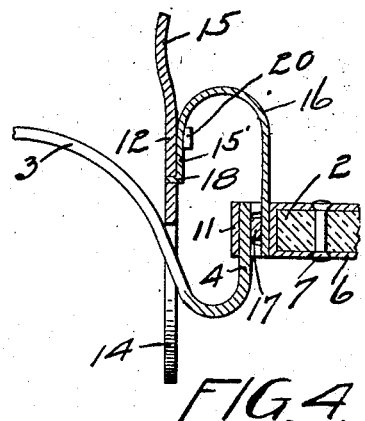
Figure 5:
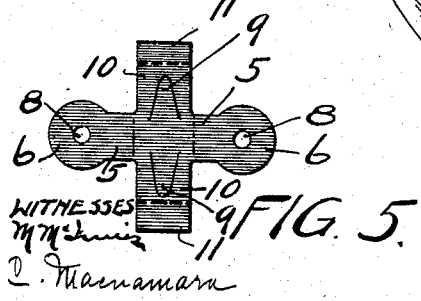
Figure 6:
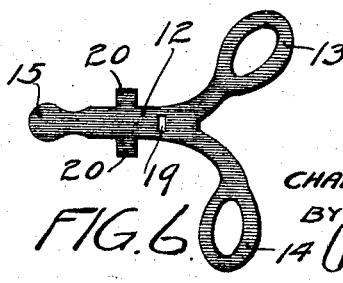

In the accompanying drawings, forming part of this specification, Figure 1 is an enlarged rear view of an eyeglass-mounting embodying my invention. Fig. 2 is a top view of a spectacle-mounting. Fig. 3 is an enlarged view of a clamp device by means of which the lens and mounting are secured together. Fig. 4 is an enlarged sectional view showing the manner of securing the bridge and nose-guard to the lens. Fig. 5 is a detail view of the lens-clamp. Fig. 6 is a similar view of one of the nose-guards.

In the drawings, 2 represents the lens, and 3 the bridge or spring connecting them. Each lens is provided with a clamp wherein the parallel ends 4 of the bridge are adjustably secured. These ends are of sufficient length to allow the bridge to be adjusted back and forth toward or from the plane of the lens to adapt the mounting to the contour of the nose and enable the optician to locate the bridge either in front or the rear of the lens or in the plane thereof. By making this bridge adjustable I am able to dispense with the large stock that opticians are usually required to carry and at the same time greatly simplify the operation of fitting the bridge to the mounting.

Any suitable means may be employed for securing the bridge to the lens; but I prefer to provide a plate 5, having straps 6 on each side, that are folded toward each other to a position substantially at right angles to the plate and between which straps the edge of the lens is inserted and secured by a rivet 7, that passes through the lens and through holes 8 in the straps. The plate 5 is also provided with lugs or ears 9, stamped out of the plate and adapted to be bent toward each other and fitted against the edge of the lens, being held firmly in position when the rivet 7 is put in place. Straps 10 are also provided on the plate 5 and are bent outwardly at right angles thereto and have ends 11, that are folded in toward each other and brazed or soldered together, forming a box or socket open at the top and bottom by reason of the ears 9 and also having open sides through which the ends 4 of the bridge are inserted. The nose-guard that I prefer to employ is connected with this mounting, as indicated by reference-numeral 12, and has two points 13 and 14 at one end to bear upon the nose and a finger-piece or lever 15 at the opposite end, that is gripped by the operator in placing the eyeglasses on the nose or removing them.

The nose-guards are supported upon the curved ends 15' of springs 16, that fit into the clamp socket or box with the ends of the bridge and are secured therein by any suitable means, preferably a wedge 17, the thin edge of which is upset to prevent the wedge from working out of the socket after the mounting is completed. The wedge may be varied in thickness, according to the size of the socket or box and the ends of the bridge and spring.

In a spectacle-mounting where no nose-guards are used a thicker wedge will be employed to secure the ends of the bridge. This manner of securing the bridge and the nose-guard to the lens avoids all perforations that tend to weaken the metal at the points of greatest strain, dispenses with many parts usually required in an eyeglass or spectacle mounting, and renders soldering and brazing, that destroy the elasticity of the metal, unnecessary. It also greatly simplifies the labor of the optician in fitting the mounting to the nose in the first instance or readjusting it or in replacing the bridge or the guard. The curved end of the spring 16 may be secured to the nose-guard in any suitable way; but I prefer to provide a lip 18 on the end of the spring, turned inwardly at right angles thereto and fitting within a slot 19 in the guard. Lugs 20 are provided near said slot, that are adapted to be bent out around the end of the spring and when brazed together will hold the guard firmly in place and prevent it from working loose or becoming separated from the spring. The finger-pieces 15, projecting beyond the curved end of the spring, allow the person wearing the glasses to easily and quickly place them on the nose or remove them.

The clamp by means of which the nose-guard and bridge are secured to the lens may be made in various ways. Instead of using a plate, as shown and described, a simple post having a socket for the ends of the bridge and guard may be employed, and, if preferred, the guard and spring may be made in one piece and in various ways the details of construction may be modified without departing from the spirit of my invention.

I claim as my invention—

1. A mounting for eyeglasses and spectacles having a bridge disposed obliquely with respect to the plane of the lens and provided with forwardly-turned ends, rearwardly-extending nose-guards having forwardly-projecting finger-pieces, springs provided on said guards and having outwardly and rearwardly turned ends, and means for securing the ends of said bridge and said springs to the lenses, substantially as described.

2. A mounting for eyeglasses and spectacles having a spring-bridge provided with forwardly-turned parallel ends, rearwardly-extending nose-guards arranged to straddle the bridge and having forwardly-projecting finger-pieces, springs secured at one end to said guards in front of the bridge and having outwardly and rearwardly turned ends, and means for securing the ends of said bridge and springs to the lenses, substantially as described.

3. A spectacle-mounting comprising a bridge obliquely disposed with respect to the plane of the lens and having forwardly-turned ends, rearwardly-extending nose-guards arranged to straddle the bridge, springs secured at one end to said nose-guards and having outwardly and rearwardly turned opposite ends, lens-clamps wherein the ends of said bridge and springs are horizontally adjustable toward or from the plane of the lens, substantially as described.

4. A combined eyeglass and spectacle mounting comprising a bridge having forwardly-turned ends, lens-clamps secured on the lens and having horizontal sockets to receive the ends of said bridge, rearwardly-extending nose-guards having springs secured at one end thereto and outwardly and rearwardly turned and fitting within said sockets, and keys or wedges also fitting said sockets and securing the ends of said bridge and springs therein and permitting the adjustment of said bridge and nose-guards toward or from the plane of the lens, substantially as described.

5. A spectacle-mounting comprising a bridge having forwardly-turned parallel ends, lens-clamps secured to the lens and having horizontal sockets to receive the ends of said bridge, rearwardly-extending nose-guards arranged to straddle the bridge, springs secured to said guards in front of the bridge and outwardly and rearwardly turned therefrom and having ends fitting within the sockets in said lens-clamps, and means adjustably securing the ends of said bridge and said springs in said clamps and allowing them to be adjusted toward or from the plane of the lens, substantially as described.

6. In a mounting for glasses, a lens-clamp comprising a plate 5, having straps 6 that are folded toward one another to straddle the lens, lugs 9 adapted to be pressed down upon the edge of the lens, and straps 10 that are folded in toward each other and have ends 11 bent substantially at right angles to the straps 10 and secured together, substantially as described.

7. In a mounting, the combination, with a nose-guard having bearing-points at one end and a finger-piece at the other, and an intermediate slot and flexible lugs, of a spring having a lip at one end to enter said slot and adapted to bear on said guard near said slot and be secured thereto by folding said lugs toward each other and securing them together, substantially as described.

In witness whereof I have hereunto set my hand this 7th day of November, 1904.

CHARLES A. HOFFMAN.

Witnesses:
RICHARD PAUL,
C. MACNAMARA.